United States Patent [19]

Sasaki et al.

[11] Patent Number: 4,528,572

[45] Date of Patent: Jul. 9, 1985

[54] THERMAL PRINTER

[75] Inventors: Akira Sasaki; Kazuyuki Mashiko; Shouji Saitoh; Akiyoshi Hakoyama, all of Hitachi, Japan

[73] Assignee: Hitachi, Ltd., Tokyo, Japan

[21] Appl. No.: 575,784

[22] Filed: Feb. 1, 1984

[30] Foreign Application Priority Data

Feb. 8, 1983 [JP] Japan ................................ 58-18222

[51] Int. Cl.³ ............................................ G01D 15/10

[52] U.S. Cl. ................................ 346/76 PH; 400/120

[58] Field of Search .................... 346/76 PH; 400/120, 400/124; 219/216

[56] References Cited

U.S. PATENT DOCUMENTS

| | | | |
|---|---|---|---|
| 3,855,448 | 12/1974 | Hanagata | 400/120 X |
| 4,010,835 | 3/1977 | Martin | 400/124 |
| 4,251,822 | 2/1981 | Hara | 346/76 PH X |
| 4,374,385 | 2/1983 | Yoshizaki | 346/76 PH X |
| 4,417,257 | 11/1983 | Mitsui | 346/76 PH |

*Primary Examiner*—Joseph W. Hartary
*Attorney, Agent, or Firm*—Antonelli, Terry & Wands

[57] ABSTRACT

A thermal printer includes an inked ribbon, an inked ribbon take-up mechanism, a print head with two arrays of thermal resistance elements, a carriage mounting the print head, and a controller for controlling the print operation. The printer is provided with print mode switching circuit which selects low-speed print mode in which one array of thermal resistance elements is activated for each dot pitch for printing, or high-speed print mode in which the two arrays of thermal resistance elements are activated alternately for every dot pitch for printing. The printer having the print head with two thermal resistance elements is capable of high-speed printing and also high quality printing at a low print speed.

5 Claims, 10 Drawing Figures

FIG. 4
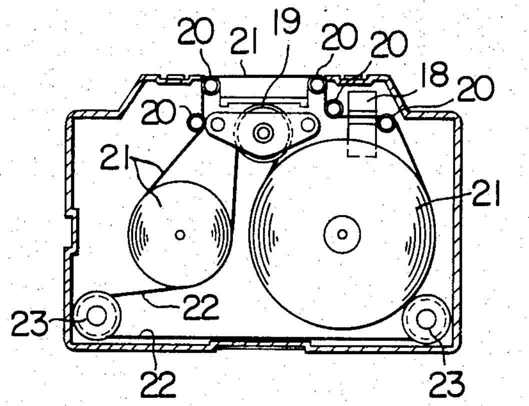
FIG. 5A
FIG. 5B
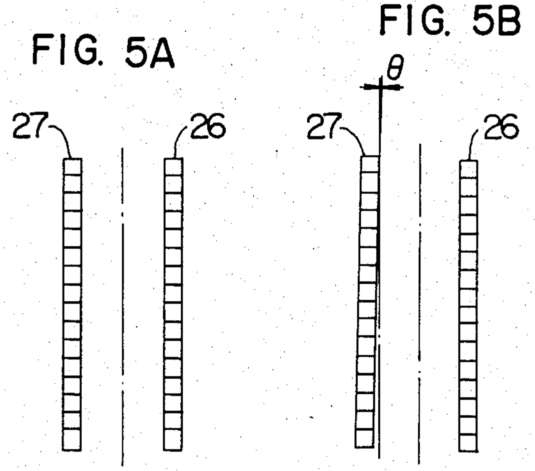
FIG. 6A
FIG. 6B
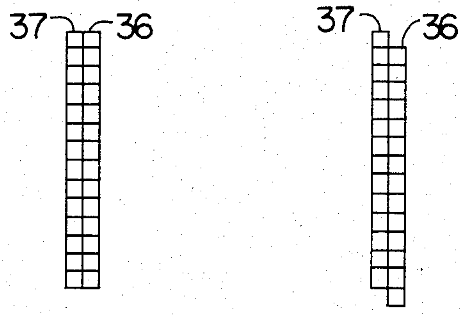

THERMAL PRINTER

The present invention relates to an improved thermal printer which performs printing on the thermosensitive paper by the print head with thermal elements.

Single head thermal printers having an array of inline thermal elements performs high quality printing, but have a drawback of slow printing speed. Whereas, dual head thermal printers having two inline thermal element arrays performs high-speed printing, but have a drawback of poor print quality. Thus, single head and dual head thermal printers have intrinsic advantages and disadvantages.

It is an object of the present invention to provide a thermal printer operable in both high-speed print mode and high-quality print mode by use of a print head having a plurality of in-line thermal element arrays.

According to one aspect of the invention there is provided a thermal printer having a print head with a plurality of in-line thermal element arrays, a carriage mounting the print head, and a controller for controlling the printing operation, wherein the printer is further provided with a print mode switching means which selects low-speed print mode in which one of the thermal element arrays is activated for each dot pitch for printing, or high-speed print mode in which thermal element arrays are activated cyclically for every dot pitch for printing.

The thermal printer of the invention is useful in two ways in low-speed print mode yielding a high quality print and in high-speed print mode by the switching of the print mode switching means. In operating the printer in low-speed print mode, the thermal element arrays can have a prolonged service life by being used cyclically or alternately, for example, for every print line.

These and other objects of the invention will be seen by reference to the description, taken in connection with the accompanying drawing, in which:

FIG. 4 is a plan view showing the interior structure of the ribbon cassette in FIG. 3;

FIGS. 5A and 5B are illustrations used to compare the accuracy of attachment of the dual in-line thermal element arrays;

FIGS. 6A and 6B are illustrations used to compare the prints produced by the thermal element arrays shown in FIGS. 5A and 5B, respectively;

Figure 1:
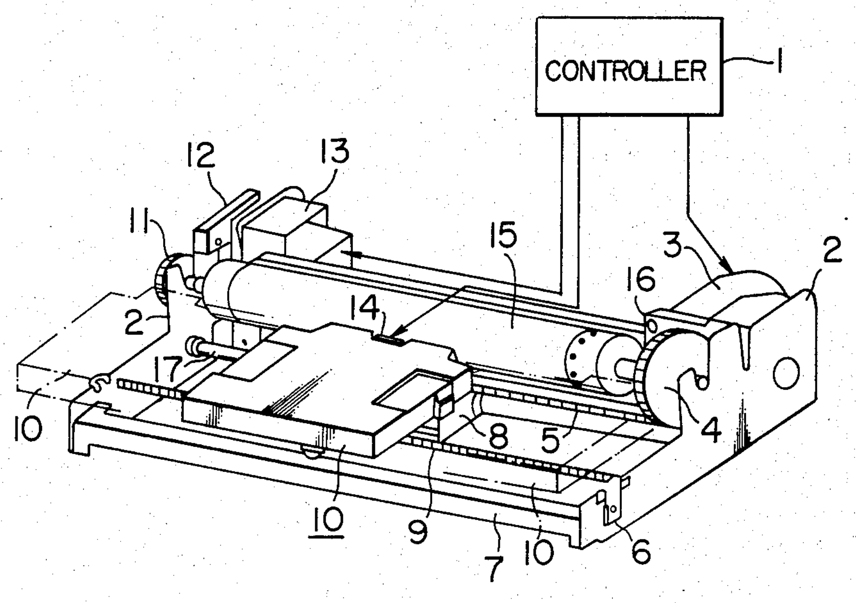
FIG. 1 is a perspective view of a thermal printer according to one embodiment of the invention.
Figure 2:
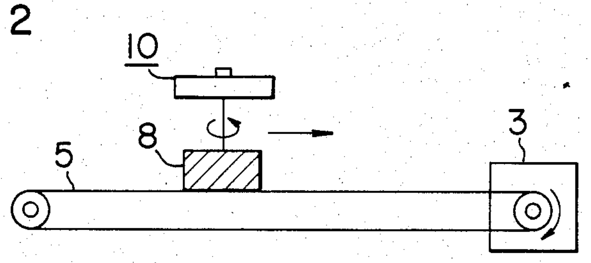
FIG. 2 is an illustration showing briefly the carriage drive system in FIG. 1.
Figure 3:
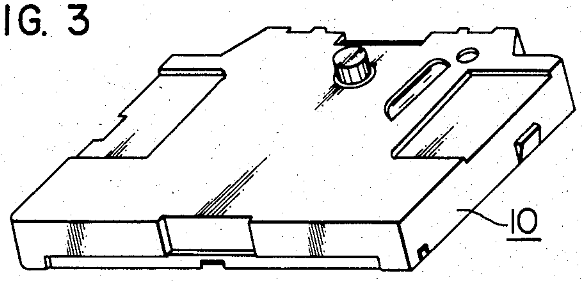
FIG. 3 is a perspective view of the ribbon cassette in FIG. 1.

The invention will now be described by way of embodiment, where the invention is applied to the thermal transfer printer, with reference to the drawings. First, the mechanism of the thermal transfer printer will be described in connection with FIGS. 1 to 4. Reference numeral 1 denotes a controller, 2 is a side plate located at each side of the printer, and 3 is a carriage drive motor. Reference numeral 4 is a paper feed knob, 5 is a carriage drive belt, 6 is a fixture, 7 is a frame, and 8 is a carriage.

Reference numeral 9 is a ribbon take-up drive belt, 10 is a ribbon cassette, 11 is a line feed motor, and 12 is a paper release lever. Reference numeral 13 is a line feed motor, 14 is a print head having two in-line thermal element arrays formed of resistance members, 15 is a platen, 16 is a motor mounting frame, and 17 is a drive shaft.

Reference numeral 18 is a ribbon sensor for detecting the end of the inked ribbon, 19 is a ribbon drive pulley, and 20 denotes each of five guide rollers. Reference numeral 21 is an inked ribbon, 22 is a ribbon take-up rubber belt, and 23 denotes two rubber belt drive pulleys.

The main frame is made up of side plates 2 secured to the motor frame 16 by screws, and the frame 7 and shaft 17 secured to the side plates 2 by screws. The line feed motor 13 is secured to the side plate 2 of the main frame by screws, and the carriage drive motor 3 is secured to the motor frame 16 by screws.

The platen 15 is supported rotatably between the side plates 2. The line feed gear 11 and paper feed knob 4 are attached to the platen 15.

The carriage 8 is supported on the shaft 17 so that it travels linearly on the shaft. The print head 14 and ribbon cassette 10 are mounted on the carriage 8. The ribbon cassette 10 is of the detachable type.

The inked ribbon 21 is run by the gear mechanism provided on the carriage 8 and the ribbon drive belt 9 which serves as a take-up timing belt. The ribbon drive pulley 19 is located inside the ribbon cassette 10. The ribbon drive pulley 19 is coupled with a gear which meshes with the ribbon drive belt 9. The ribbon take-up rubber belt 22 is run among the ribbon drive pulley 19 and ribbon take-up pulleys 23, and at the same time it is in contact with the outer surface of the inked ribbon 21 on the take-up reel and the inked ribbon 21 on the supply reel.

As the carriage 8 travels, the gear meshing with the ribbon drive belt 9 rotates, and the ribbon drive pulley 19 is rotated. Consequently, the rubber belt 22 moves and both inked ribbons 21 also move. The ribbon drive pulley 19 has a mechanism so that it rotates only in one direction. Namely, the ribbon drive pulley 19 rotates only when the carriage 8 travels in the printing direction, whereas in the return movement of the carriage 8 the ribbon drive pulley 19 does not rotate and thus the inked ribbons 21 are left stationary. The inked ribbons 21 move for printing only when the carriage 8 travels in the direction shown by the arrow in FIG. 2.

The arrays 26, 27 of heat elements or resistance elements provided on the print head are arranged in two lines as shown in FIGS. 5A and 5B. FIG. 5A shows the arrangement in which both the arrays 26 and 27 of resistance members are placed in parallel to the reference line (e.g., the vertical line), whereas FIG. 5B shows the arrangement in which one array of resistance members is placed at an angle of $\theta$ with respect to the reference line.

FIGS. 6A and 6B show the prints produced by the dual in-line print head 14 shown in FIGS. 5A and 5B, respectively. In the figures, reference numerals 36 and 37 denote simple patterns printed by the dual in-line print head 14. FIG. 6A shows a vertical line made up of two adjacent dot lines transferred by two arrays 26 and 27 of the resistance members in the arrangement shown in FIG. 5A. FIG. 6B shows a vertical line printed by the dual in-line print head 14 arranged as shown in FIG. 5B.

Accordingly, the dual in-line print head 14 arranged as shown in FIG. 5B produces an inferior print. In addition, the dual in-line print head apts to produce uneven thickness of print due to the unbalanced pressure of two arrays of the resistance members to the platen. The poor print quality of the dual in-line print head is compensated by the doubled print speed as compared with the single in-line print head, and the dual in-line print head is suitable, for example, for program listing with personal computers where the print quality is not an important matter.

Figure 7:
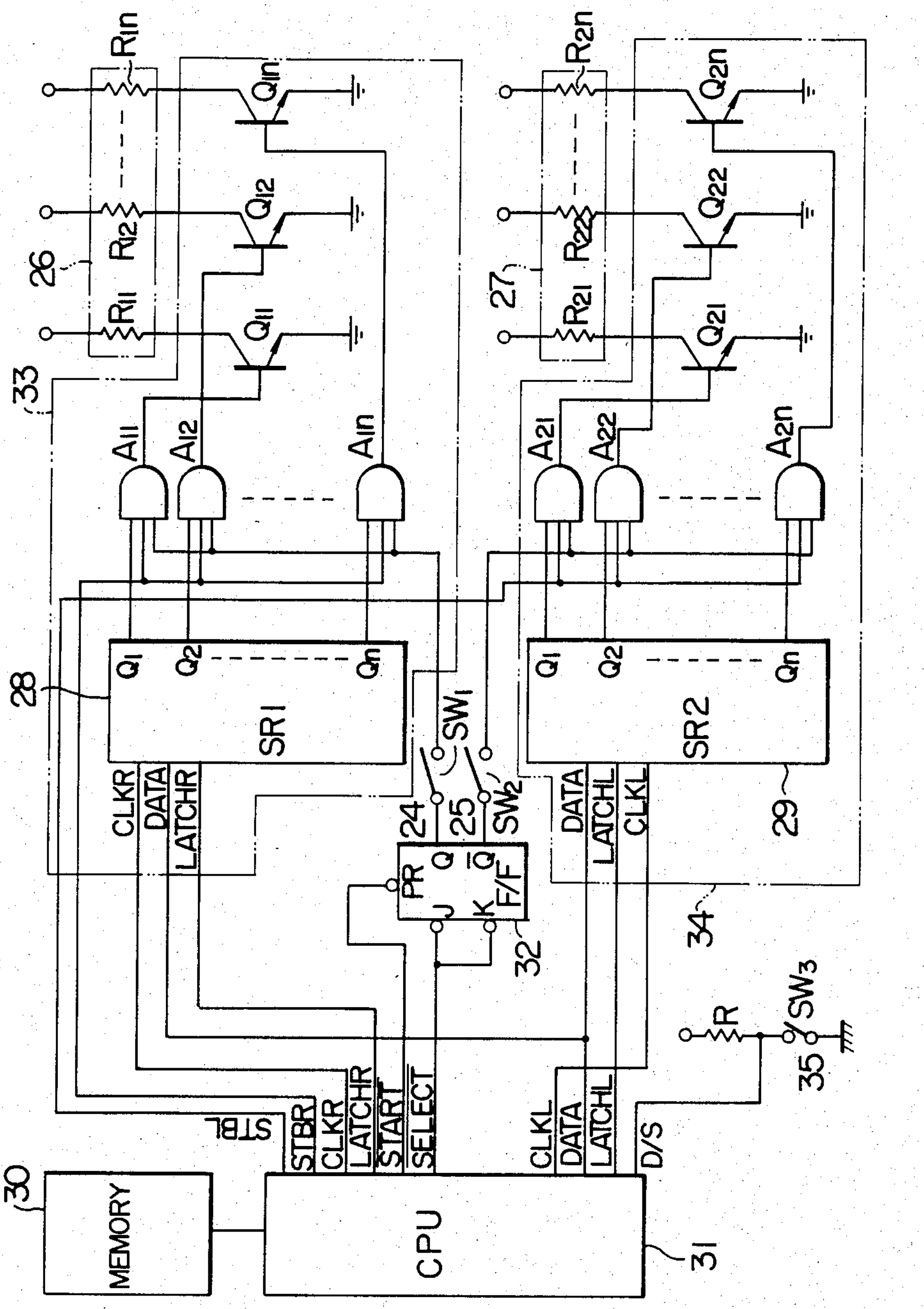
FIG. 7 is a schematic diagram primarily showing the controller in FIG. 1.

The present invention contemplates to provide a high-speed dual head printer with a high quality printing capability which is requested by word processors and the like. The following describes the principal portions of the invention in connection with FIGS. 7 and 8.

Reference numerals 24 and 25 denote switches (SW1 and SW2), and 26 and 27 denote arrays of resistance members (right and left) serving as in-line thermal elements provided on the dual in-line print head 14. Reference numerals 28 and 29 are shift registers (SR1 and SR2), 30 is a memory, 31 is a processor (CPU), and 32 is a flip-flop (F/F). Reference numerals 33 and 34 are head drivers for activating the right and left thermal resistance members of the arrays 26 and 27, respectively. Reference numeral 35 is a switch (SW3), $A_{11}$–$A_{1n}$ and $A_{21}$–$A_{2n}$ are logical AND gates, $R_{11}$–$R_{1n}$, $R_{21}$–$R_{2n}$ and R are thermal resistance members, and $Q_{11}$–$Q_{1n}$ and $Q_{21}$–$Q_{2n}$ are transistors.

The operation of the high-speed dual head print mode by the foregoing circuit arrangement will first be described. For high-speed printing by both arrays 26 and 27 of the thermal resistance members, switches 24 and 25 are closed. In this state, the circuit operates as shown by the timing chart of FIG. 8. Namely, the processor 31 issues a print start signal $\overline{\text{START}}$, causing the flip-flop 32 to be set with its Q output being high and $\overline{Q}$ low, and then the right-hand head driver 33 is selected.

The processor 31 sends n-bit serial print data DATA over the DATA line to the shift register 28 in synchronization with the CLKR signals which serve as the clock signals for shifting the shift register 28. Then, the n-bit print data is latched in the shift register 28 (outputs $Q_1$–$Q_n$) in response to the latch signal LATCHR.

Subsequently, the processor 31 issues a print command signal STBR, causing the transistors $Q_{11}$–$Q_{1n}$ to selectively drive the thermal resistance members $R_{11}$–$R_{1n}$ of the array 26 in accordance with the parallel print data each provided at one input of each of the AND gates $A_{11}$–$A_{1n}$.

Next, the processor 31 issues an array selection signal $\overline{\text{SELECT}}$ to designate the left-hand head driver 34, and sends n-bit serial print data DATA over the DATA line to the shift register 29 in synchronization with the CLKL signal which serve as the clock signals for shifting the shift register 29. Then, the processor 31 issues a print command signal STBL, causing the transistors $Q_{21}$–$Q_{2n}$ to drive the thermal resistance members $R_{21}$–$R_{2n}$ of the (left) array 27 in accordance with the parallel print data each provided at one input of each of the AND gates $A_{21}$–$A_{2n}$.

These operations are repeated, and line feed takes place after one complete line has been printed, and the sequence restarts from the beginning. It will be appreciated that the CPU 31 successively reads data to be printed from the memory 30. The speed of the carriage drive motor 3 is specified by the D/S signal shown in the figure so that the motor rotates at m RPM when the switch 35 is closed, or rotates at a speed higher than m RPM when the switch 35 is opened as in dual head print mode.

Figure 8:
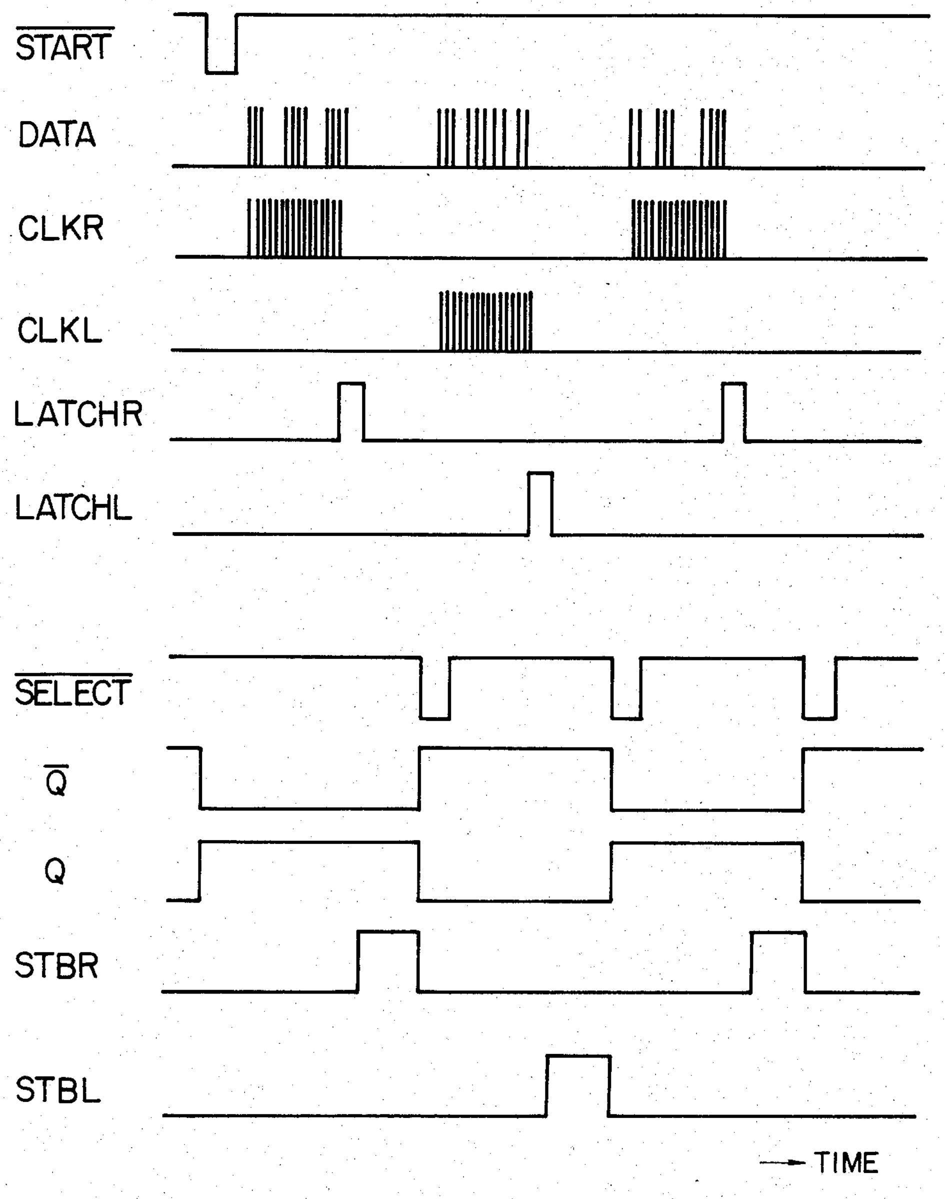
FIG. 8 is a timing chart for the major signals observed in the controller in FIG. 7.

Next, the operation of low-speed print mode will be described. With any one of the switches 24 and 25 being open, only one of arrays 26 (right) or 27 (left) is activated for printing. When the switch 25 is set open, the right-hand head driver 33 is selected to drive the thermal resistance members $R_{11}$–$R_{1n}$ of the (right) array 26 for printing. The switch 35 is left closed, so that the carriage drive motor 3 rotates at the lower speed as mentioned previously. For convenience of explanation, the motor speed is assumed to be half that of dual head print mode. The clock signal CLKR, latch signal LATCHR and print command signal STBR may be processed identically to the case of dual head print mode as shown in FIG. 8. But, for print data, the data transfer intervals must be made coincident with the traveling speed of the carriage 8 by the processor 31, i.e., print data is transferred at a half speed. Then, by setting the switch 24 open and switch 25 closed, only the thermal resistance members of the left-hand array, as opposed to the previous case, is activated for printing. Accordingly, it will be appreciated that characters can be printed in two print speeds.

The arrangement in the embodiment of the invention allows the selection of dual head print mode (high-speed printing) and single head print mode (low-speed printing), thereby providing: (1) versatility for extensive applications, and (2) doubled interval of exchanging the print head by the provision of a spare array of thermal elements when one of the arrays is always used in the printer for high quality printing as required for a word processor.

The invention realizes a thermal printer which is operable in both low-speed, high quality print mode and high-speed, low quality print mode. Moreover, by using a plurality of arrays each consisting of thermal elements cyclically in high quality print mode, the service life of thermal elements can be doubled advantageously.

We claim:

1. A thermal printer comprising:

a print head with a plurality of arrays of in-line thermal elements, a carriage mounting said print head, a controller for controlling the printing operation, and print mode switching means which selects low-speed print mode in which one array of thermal elements is activated for each dot pitch for printing, or high-speed print mode in which the arrays are activated cyclically for every dot pitch for printing.

2. A thermal printer comprising:

a print head with two arrays of in-line thermal elements, a carriage mounting said print head, a controller for controlling the printing operation, and print mode selection means which selects low-speed print mode in which one array of thermal elements is activated for each dot pitch for printing, or high-speed print mode in which the two arrays of thermal elements are activated alternately for every dot pitch for printing.

3. A thermal printer comprising:

an inked ribbon, an inked ribbon take-up mechanism, a print head with two arrays of in-line thermal elements, a carriage mounting said print head, a controller for controlling the printing operation, and print mode switching means which selects low-speed print mode in which one array of thermal elements is activated for each dot pitch for printing, or high-speed print mode in which the two arrays of thermal elements are activated alternately for every dot pitch for printing.

4. A thermal printer comprising:

a print head with two arrays of in-line thermal elements,
a carriage mounting said print head,
an inked ribbon case mounted on said carriage,
a supply reel and take-up reel mounted on said inked ribbon case,
an inked ribbon wound on said supply and take-up reels,
a reel driver for spinning said supply reel,
a carriage driver for moving said carriage, and
print mode switching means which selects low-speed print mode in which one array of thermal elements is activated for each dot pitch for printing, or high-speed print mode in which the arrays of thermal elements are activated alternately for every dot pitch for printing.

5. A thermal printer according to claim 4, wherein said print mode switching means changes said arrays of the in-line thermal element to be activated for every print line or every predetermined number of print lines during the low-speed print mode.

* * * * *